United States Patent [19]

Gannon et al.

[11] Patent Number: 4,737,553

[45] Date of Patent: Apr. 12, 1988

[54] ADVANCED RESINS FROM DIGLYCIDYL ETHERS OF DI-SECONDARY ALCOHOLS AND DIHYDRIC PHENOLS

[75] Inventors: John A. Gannon, Danbury, Conn.; Joseph S. Puglisi, Crompond, N.Y.; Vincent Brytus, Mahopac, N.Y.; Kenneth L. Payne, Yonkers, N.Y.

[73] Assignee: Ciba-Geigy Corporation, Ardsley, N.Y.

[21] Appl. No.: 912,722

[22] Filed: Sep. 29, 1986

[51] Int. Cl.$^4$ .................. C80G 59/02; C80G 59/62
[52] U.S. Cl. ................................. 525/481; 525/509; 525/510; 528/97; 528/98; 528/99; 528/101; 528/103; 528/104; 528/110
[58] Field of Search ............... 528/97, 98, 99, 101, 528/103, 104, 110; 525/509, 510, 481

[56] References Cited

U.S. PATENT DOCUMENTS

| | | | |
|---|---|---|---|
| 3,547,881 | 12/1970 | Mueller | 528/101 |
| 3,978,027 | 8/1976 | Marshall | 528/104 |
| 4,122,067 | 10/1978 | Anderson | 528/88 |
| 4,284,574 | 8/1981 | Bagga | 549/555 |

*Primary Examiner*—Harold D. Anderson
*Assistant Examiner*—Fred Krass
*Attorney, Agent, or Firm*—Harry Falber

[57] ABSTRACT

Advanced epoxy resins prepared by the reaction of diglycidyl ethers of di-secondary alcohols and dihydric phenols, said advanced resins being heat curable with suitable curing agents to afford cured coating compositions exhibiting a variety of excellent physical properties and performance characteristics.

11 Claims, No Drawings

ADVANCED RESINS FROM DIGLYCIDYL ETHERS OF DI-SECONDARY ALCOHOLS AND DIHYDRIC PHENOLS

The so-called "advancement" of relatively low molecular and low-melting or liquid epoxide resins by reaction with poly-functional compounds of which the functional groups react with epoxide groups, to give relatively higher molecular, higher melting epoxide resins is known. Such a so-called "advancement" is above all intended to improve or modify, in the desired direction, the technical processing properties for certain end uses. For some end uses, for example in sintering powders, compression moulding powders and the like, an increase in the softening point or melting point can be desirable.

The subject of the present invention is an advanced epoxy resin product which is obtained by reacting a diglycidyl ether of a di-secondary alcohol and a dihydric phenol. Subsequent to curing, these advanced resins are functional as high solids coating compositions and adhesives. These systems enhance the performance characteristics of the cured products in terms of adhesion, flexibility, chemical resistance, salt fog corrosion resistance and mechanical properties including hardness, impact strength and mechanical strength.

The applicable diglycidyl ethers of di-secondary alcohols, processes for the preparation thereof and curable compositions thereof as blends with epoxy resins are disclosed in U.S. Pat. No. 4,284,574. These ethers correspond to the formula

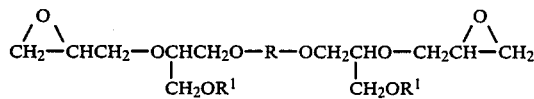

wherein R is phenylene, naphthylene or a radical consisting of two or three phenylene groups linked by one or two carbon-carbon bonds, ether oxygen atoms, sulphur atoms, sulphonyl groups, sulphoxide groups, carbonyl groups, or alkylene groups of 1 to 5 carbon atoms, each phenylene group or each naphthylene group optionally being substituted in the ring or rings by one or two alkyl groups, each of from 1 to 4 carbon atoms, or by one or two chlorine or bromine atoms; and $R^1$ independently are a straight chain or branched alkyl group of 1 to 16 carbon atoms, which may be substituted by one or four chlorine or bromine atoms; a straight chain or branched alkenyl group of 2 to 6 carbon atoms, which may be substituted by one to four chlorine or bromine atoms; a phenyl or naphthyl group, optionally substituted in the ring or rings by one or two chlorine or bromine atoms or by one or two alkyl groups, each of 1 to 4 carbon atoms, and having in all from 6 to 12 carbon atoms; a phenylalkyl or naphthylalkyl group, optionally substituted in the ring or rings by one or two chlorine or bromine atoms or by one or two alkyl groups, each of 1 to 4 carbon atoms, said phenylalkyl or naphthylalkyl group having in all from 7 to 12 carbon atoms; a cycloalkyl group of 3 to 6 carbon atoms; or a cycloalkylalkyl group of from 4 to 10 carbon atoms.

Preferably, the groups $R^1$ are the same and each represents an alkyl group of 1 to 14 carbon atoms, an allyl group, a cyclohexyl group, or a benzyl group. Further preferred compounds are those wherein R represents a radical consisting of two phenylene rings linked in the o—o', o—p', or p—p' position by an alkylene group of 1 to 4 carbon atoms. Compounds where R represents a group of formula

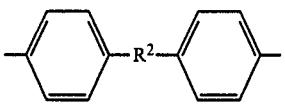

where $R^2$ represents a methylene or isopropylene group, and those where each $R^1$ represents an alkyl group of from 1 to 12 carbon atoms, more particularly of from 1 to 6 carbon atoms, are especially preferred.

Specific examples of diglycidyl ethers are:
2,2-bis(p-(3-butoxy-2-glycidyloxypropyloxy)phenyl)propane;
2,2-bis(p-(3-methoxy-2-glycidyloxypropyloxy)phenyl)propane;
2,2-bis(p-(3-ethoxy-2-glycidyloxypropyloxy)phenyl)propane;
2,2-bis(p-(3-dodecyloxy-2-glycidyloxypropyloxy)phenyl)propane;
2,2-bis(p-(3-tetradecyloxy-2-glycidyloxypropyloxy)phenyl)propane;
2,2-bis(p-(3-benzyloxy-2-glycidyloxypropyloxy)phenyl)propane;
bis(p-(3-butoxy-2-glycidyloxypropyloxy)phenyl)methane;
1,3-bis(3-phenoxy-2-glycidyloxypropyloxy)benzene;
bis(p-(3-butoxy-2-glycidyloxypropyloxy)phenyl)sulphone;
2,2-bis(p-(3-cyclohexyloxy-2-glycidyloxypropyloxy)phenyl)propane;
2,2-bis(4-(3-butoxy-2-glycidyloxypropyloxy)3,5-dibromophenyl)propane;
2,2-bis(p-(3-allyloxy-2-glycidyloxypropyloxy)phenyl)propane;
2,2-bis(p-(3-benzyloxy-2-glycidyloxypropyloxy)phenyl)propane;
1,3-bis(2-glycidyloxy-3-phenoxypropyloxy)benzene; and
2,2-bis(p-(3-phenoxy-2-glycidyloxypropyloxy)phenyl)propane.

The applicable dihydric phenols correspond to the formula

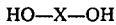

wherein X is 1,2-phenylene, 1,3-phenylene, 1,4-phenylene or

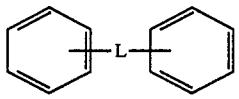

wherein L is a direct bond, alkylene of 1 to 6 carbon atoms, alkylidene of 2 to 6 carbon atoms, or

These represent, for example, bisphenols F, A and S, catechol, resorcinol, o,o'-biphenol and p,p'-biphenol.

The various phenols may be substituted on the respective phenyl rings by such non-reactive substituents as halogen, alkyl and the like. Bisphenol A is preferred.

The diglycidyl ether of the di-secondary alcohol will generally be present in concentrations ranging from 70 to 95%, by weight of the advanced adduct, and preferably 75 to 90%. Correspondingly, the dihydric phenol is present in concentrations ranging from 30 to 5%, by weight of the advanced adduct, and preferably 25 to 10%. The respective concentrations are selected in order to insure the appropriate molecular weight for the advanced product.

The reaction procedure, i.e. advancement reaction, is well known to those skilled in the art and generally involves the reaction of the diglycidyl ether and dihydric phenol in the presence of an advancing catalyst or accelerator. Typical accelerators include alkali metal hydroxides, imidazoles, phosphonium compounds, and the like. The specific choice of catalyst will depend on the intended end use application. In order to facilitate the initial blending operation, it may be desirable to warm the diglycidyl ether to about 90 to 120° C. and then to add dihydric phenol. Stirring at this point provides a clear melt blend. The catalyst is then added and the temperature is raised to 130 to 180° C. to effect the advancement reaction. The progress of the reaction can be monitored by titration of the epoxide groups using samples taken during the reaction. Completion of the reaction will generally take 2 to 15 hours to provide resin systems having epoxy values in the range of 0.01–0.2 epoxy equivalents per 100 grams of resin. The resulting advanced resins are viscous liquids or tack-free solids.

Depending upon the desired end use application, the resin will be formulated with the appropriate ingredients and combined with the appropriate hardener and accelerator components. For the primary area of utility of the instant resin systems as coating compounds, melamineformaldehyde curing agents are preferred. Other applicable curing agents include di- or polyfunctional isocyanates, urea-formaldehyde resins, phenol-formaldehyde resins and additional conventional curing agents.

An effective amount of the curing agent is employed. The proportion will depend on the chemical nature of the curing agent and the properties sought of the curable composition and its cured product; the optimum proportion readily being determined by methods familiar to those skilled in the art. By way of illustration, the hardener may be used in concentrations ranging from 5 to 20%, by weight of the total advanced resin.

The resin-hardener systems can furthermore be mixed, prior to cure, with usual modifiers such as extenders, fillers and reinforcing agents, pigments, dyestuffs, plasticizers, diluents, accelerators, and the like. As extenders, reinforcing agents, fillers and pigments which can be employed in the curable systems according to the invention there may be mentioned, for example: coal tar, bitumen, glass fibers, boron fibers, carbon fibers, cellulose, polyethylene powder, polypropylene powder, mica, asbestos, various quartz powders, fused silicas, silicates, silanes, magnesium and calcium carbonates, gypsum, bentones, silica aerogel ("Aerosil"), lithopone, barite, titanium dioxide, carbon black, graphite, or iron powder. It is also possible to add other usual additives, for example flameproofing agents such as antimony trioxide, agents for conferring thixotropy, flow control agents such as silicones, cellulose acetate butyrate, polyvinyl butyral waxes, stearates and the like (which are in part also used as mold release agents) to the curable systems. The accelerators that are added may be identical to the advancement catalysts or may additionally include boron trifluoride monoethylamine complexes, tertiary amines, and the like.

The end products can be manufactured in the usual manner with the aid of known mixing equipment (kneaders, extruders, rollers, and the like).

Curing will generally be conducted at temperatures ranging from 175 to 225° C. The expression "cure", as used herein, denotes the conversion of the above systems into insoluble and infusible crosslinked products, with simultaneous shaping to give shaped articles such as moldings, pressings or laminates, or to give two-dimensional structures such as coatings, enamels or adhesive bonds.

The curable epoxide resin mixtures are especially useful in the fields of surface protection, the electrical industry, laminating processes and the building industry. They can be used in a formulation which is in each case suited to the particular end use, in the unfilled or filled state, optionally in the form of solutions or emulsions, as paints, enamels, sintering powders, compression molding compositions, dipping resins, casting resins, injection molding formulations, impregnating resins and adhesives, as tooling resins, laminating resins, sealing and filling compositions, floor covering compositions and binders for mineral aggregates.

Of primary interest is their utility as protective coatings. The coating composition may be applied to any suitable substrate by any suitable means such as spraying, dipping, brushing, painting or roller coating. After the desired film thickness is applied, curing proceeds at elevated temperatures. The resultant cured coatings are void-free and possess excellent physical properties and chemical resistance. The distinct advantage of these systems is exhibited in the former area where excellent mechanical properties are noted. Of particular value is the unexpected low viscosity compared to standard bisphenol A/epichlorohydrin resins. This low viscosity allows for the formulation of higher solids coatings thus reducing the level of solvent emissions and facilitating compliance with regulations of the Environmental Protection Agency. Correspondingly, coatings based on these resins also result in an unexpectedly high salt fog corrosion resistance and are characterized by having better adhesion and flexibility than standard bisphenol A resins.

The following examples will further illustrate the embodiments of the instant invention. In these examples, all parts are given by weight unless otherwise noted.

EXAMPLE 1

This example illustrates the preparation of typical advanced resins of this invention.

The diglycidyl ether, bisphenol and catalyst are charged to a two liter, 4-neck break-away reaction kettle equipped with a mechanical stirrer, condenser, and thermometer/Thermowatch ® temperature regulator. The system is flushed for thirty minutes with $N_2$ followed by gradual heating via a heating mantle to the desired reaction temperature. A schedule of 2 hours at 130° C. followed by heating at 180° C. until the resins are in the theoretical epoxy specification is employed.

Samples are removed from the reaction kettle periodically using a deflagration spoon, dissolved in 50 ml of 1:1 mixture of benzyl alcohol/isopropanol, and brought to a mild reflux. 5.0 ml of a freshly prepared solution of potassium iodide (3 g/5 ml H₂O) are added to this medium along with 10 drops of a 0.04% solution of bromophenol blue. This resulting mixture is then titrated under reflux to a faint yellow end-point with 1.0 N standardized hydrochloric acid. Heating is discontinued and the resulting molten epoxy resin is poured into a lined tray and allowed to solidify once the epoxy value is within specification.

The following advanced resins are prepared:

|  | Resin (parts) | | | |
| --- | --- | --- | --- | --- |
|  | A | B | C | D |
| 2,2-bis(p-3(butoxy-2-glycidyl-oxypropyloxy)phenyl)propane | 1000 | 1000 | 1000 | 1000 |
| bisphenol A | 100 | 200 | 265 | 293 |
| formylmethyltriphenylphosphoniumchloride (catalyst) | 0.1 | 0.1 | 0.1 | 0.1 |
| final epoxy value (eq./100 g) | 0.205 | 0.116 | 0.057 | 0.037 |
| final epoxide equivalent weight (g) | 488 | 862 | 1754 | 2703 |
| Gardner-Holdt bubble viscosity @ 25° C. (40% non-volatiles in butyl carbitol) | <A | B | H | M |
| Brookfield viscosity @ 25° C. (cps) | 16,000 (100% non-volatiles) | 65 | 200 | 275 |
|  |  | (40% non-volatiles in butyl carbitol) | | |
| Gardner color (40% non-volatile in butyl carbitol) |  | 1 | 1–2 | 3–4 | 4 |
| resin type* | 1 | 4 | 7 | 9 |

*Informal notation directed to advanced resins reflecting an approximate measure of the number of repeating units in the resin chain.

EXAMPLE II

The adducts of Example I are formulated into curable coating systems as follows: Adduct (30 parts-55% weight solids in 1:1:1 methyl ethyl ketone/n-butanol/xylene); Cymel 303, an alkylated melamine-formaldehyde crosslinking resin from American Cyanamid (1.87 parts); p-toluene sulfonic acid (PTSA) catalyst (0.183 parts); and 1:1:1 methyl ethyl ketone/n-butanol/xylene (16 parts); to indicate the following:
Hardener: Cymel 303
Resin/Hardener Ratio: 90:10
% solids content: 38.15

Control systems are also prepared using identical concentrations and conditions except that diglycidylated ether of bisphenol A is substituted for the glycidylated butoxy propane.

The formulated materials are drawn into 8 mil wet films on cold rolled steel, allowed a five minute induction period, air dried for 60 minutes at 25° C. and then cured for 20 minutes at 200° C. The resulting films exhibit the following properties:

|  | Formulation | | | | | |
| --- | --- | --- | --- | --- | --- | --- |
|  | 1 | 2 | 3 | 4 | 5 | 6 |
| Adduct | B | B-control | C | C-control | D | D-control |
| Appearance | clear smooth glossy | clear bubbles glossy | clear smooth glossy | clear smooth glossy | clear ripples glossy | clear smooth glossy |
| Thickness (mils)[a] | 1.5–1.75 | 1.1–2.5 | 1.5–2.5 | 1.0–2.25 | 1.25–2.5 | 1.75–2.5 |
| Persoz (sec.)[b] | 72 | 395 | 309 | 388 | 274 | 392 |
| Direct Impact (cm. kg.)[c] | 184 | 39.1 | 74.8 | 46 | 69 | 46 |
| Reverse Impact (cm. kg.)[d] | 184 | 9.2 | 28.8 | 6.9 | 184 | 4.6 |
| Pencil Hardness[e] | 3B | 2H | 3H | 3H | F | 5H |
| Adhesion (%)[f] | 100 | 100 | 100 | 100 | 100 | 100 |
| Mandrel Bend[g] | Pass 0.3 cm | Pass 0.3 cm | Pass 0.3 cm | Pass 0.3 cm | Pass 0.3 cm | Pass 0.6 cm |

[a] dry film thickness
[b] ASTM D 4366
[c] ASTM G 14
[d] ASTM G 14
[e] ASTM D 3363
[f] ASTM D 3359
[g] ASTM G 10

EXAMPLE III

Additional adducts are prepared by charging the reactants to a 2 liter, 4-neck breakaway flask equipped with a mechanical stirrer, reflux condenser and a thermometer/Thermowatch temperature regulator. The reactants are warmed to 180? C. and held at this temperature until a predetermined epoxy value is obtained.

|  | Resin (parts) | | |
| --- | --- | --- | --- |
|  | E | F | G |
| 2,2-bis(p-3(butoxy-2-glycidyl-oxypropyloxy)phenyl)propane | 1000 | 1000 | 1000 |
| bisphenol A | 200 | 265 | 300 |
| formylmethyltriphenylphosphonium chloride(catalyst) | 0.5 | 1.5 | 2.0 |
| reaction time (hours) | 8.0 | 14.0 | 14.0 |
| final epoxy value (eq./100 g) | 0.115 | 0.062 | 0.037 |
| Gardner-Holdt bubble viscosity @ 25° C. | D | I–J | K |
| Gardner color | 2–3 | 6 | 6 |
| resin type | 4 | 7 | 9 |

EXAMPLE IV

Example II is repeated with the exception that various Resimene melamine-formaldehyde crosslinking resins from Monsanto Chemical Co. are utilized in place of the Cymel 303. The formulations are as follows:
Adduct (30 parts - 55% weight solids in 1:1:1 methyl ethyl ketone/n-butanol/xylene)
Resimene 741 (21 parts-87% weight solids in isopropanol)
Resimene 747 (1.87 parts)
Resimene 797 (2.01 parts-91% weight solids in ethanol)
PTSA (0.183 parts)
1:1:1 methyl ethyl ketone/n-butanol/xylene with
741 (15.33 parts)
747 (15.557 parts)
797 (15.420 parts)
Resin/Hardener Ratio: 90:10

% solids content: 38.15

The films prepared as in Example II exhibit the following properties.

TABLE I

Resimene 741 Crosslinking Agent

| Adduct | E | E-control | F | F-control | G | G-control |
|---|---|---|---|---|---|---|
| Appearance | clear glossy smooth | clear glossy bubbles | clear glossy smooth | clear glossy smooth | clear glossy smooth | clear glossy smooth |
| Thickness (mils) | 1.5–2.0 | 2–3 | 2.0–2.5 | 1.5–2.2 | 1.5–2.5 | 2.0 |
| Persoz (sec.) | 107 | 379 | 170 | 400 | 213 | 386 |
| Direct Impact (cm. kg.) | 184 | 34.5 | 184 | 52.9 | 184 | 57.5 |
| Reverse Impact (cm. kg.) | 184 | 2.3 | 184 | 6.9 | 184 | 11.5 |
| Pencil Hardness | F | 4H | HB | 3H | 2H | 7H |
| Adhesion (%) | 100 | 100 | 100 | 100 | 100 | 100 |
| Mandrel Bend | Pass 0.3 cm | Pass 0.3 cm | Pass 0.3 cm | Pass 0.3 cm | Pass 0.3 cm | Pass 0.3 cm |

TABLE II

Resimene 747 Crosslinking Agent

| Adduct | E | E-control | G | G-control |
|---|---|---|---|---|
| Appearance | clear glossy ripples | clear glossy smooth | clear glossy ripples | clear glossy smooth |
| Thickness (mils) | 1.5–2.0 | 1.5–2.5 | 2.25–2.5 | 1.5–2.25 |
| Persoz (sec.) | 139 | 392 | 340 | 382 |
| Direct Impact (cm. kg.) | 184 | 40.25 | 103.5 | 43.7 |
| Reverse Impact (cm. kg.) | 184 | 2.3 | 57.5 | 4.6 |
| Pencil Hardness | 2H | 2H | 2H | B |
| Adhesion (%) | 100 | 100 | 100 | 85 |
| Mandrel Bend | Pass 0.3 cm | Pass 0.6 cm | Pass 0.3 cm | Pass 0.9 cm |

TABLE III

Resimene 797 Crosslinking Agent

| Adduct | E | E-control | F | F-control | G | G-control |
|---|---|---|---|---|---|---|
| Appearance | clear glossy smooth | clear glossy smooth | clear glossy smooth | clear glossy smooth | clear glossy smooth | clear glossy smooth |
| Thickness (mils) | 1.5–2.2 | 0.9—2.2 | 1.8–2.5 | 2.0–2.2 | 1.6–2.2 | 1.4–2.4 |
| Persoz (sec.) | 47 | 400 | 192 | 402 | 302 | 263 |
| Direct Impact (cm. kg.) | 86.25 | 34.5 | 184 | 74.75 | 184 | 69 |
| Reverse Impact (cm. kg.) | 126.5 | 2.3 | 184 | 80.5 | 184 | 57.5 |
| Pencil Hardness | 2B | 2H | F | 5H | 2H | 5H |
| Adhesion (%) | 100 | 100 | 100 | 100 | 100 | 100 |
| Mandrel Bend | Pass 0.3 cm | Pass 0.3 cm | Pass 0.3 cm | Pass 0.3 cm | Pass 0.3 cm | Pass 0.3 cm |

EXAMPLE V

Adducts E, F and G as noted in Example III are duplicated with the exception that the indicated catalyst is replaced by 1.5 parts of FC-520, a trifluoromethane sulfonic acid salt catalyst from 3 M Co. The resulting adducts are designated H, I and J, respectively, reflecting 4, 7 and 9 resin types.

Each of adducts H, I and J is formulated into a curable coating system according to the procedure of Example II with the exception that HZ 949-U, a phenol-formaldehyde condensate crosslinking resin from CIBA-GEIGY Corporation, in a resin hardener ratio of 3:1, by weight, is utilized as is a methyl ethyl ketone solvent to provide solutions having 55%, by weight, solids (non-volatiles). The viscosity of the resulting resin systems is then determined by a Brookfield Viscometer @25° C. with the following results.

| Adduct | H | H-Control | I | I-control | J |
|---|---|---|---|---|---|
| Resin solution viscosity (cps) | 100 | 750 | 100 | 4500 | 150 |
| % non-volatiles required to obtain resin solution of 1000 cps | 70 | 55* | 70 | 43 | 70 |
| Total resin (% non-volatiles) | 63-6 | 53.7 | 63.6 | 44.5 | 63.6 |

*% non-volatiles required to obtain resin solution of 750 cps.

It is thus seen that the adducts of this invention allow for the formulation of desired high solids systems.

EXAMPLE VI

The formulated adducts prepared in Example V are drawn into 6 mil wet films on cold rolled steel, air dried for 30 minutes at 25° C. and then cured for 20 minutes at 200° C.

These film exhibit the following properties.

| Adduct | H | H-Control | I | I-Control | J |
|---|---|---|---|---|---|
| Appearance | clear smooth | clear smooth | clear smooth | clear smooth | clear smooth |
| Thickness (mils) | 2 | 2 | 2 | 2 | 2 |
| Persoz (sec.) | 209 | 243 | 320 | 382 | 330 |
| Direct Impact (cm. kg.) | 184 | 92 | 184 | 184 | 184 |
| Reverse Impact (cm. kg.) | 53 | 37 | 46 | 184 | 32 |
| Pencil Hardness | 2H | 2H | 2H | 5H | 2H |
| Adhesion (%) | 100 | 100 | 100 | 100 | 100 |
| Mandrel Bend | pass 0.3 cm | pass 0.3 cm | pass 0.3 cm | pass 0.3 cm | pass 0.3 cm |

These data thus indicate excellent mechanical properties, particularly adhesion, flexibility and high direct impact, for the adducts of this invention.

EXAMPLE VII

The surface protection properties of the adducts of this invention are determined by means of the Salt Fog Corrosion Test. The test is conducted in a Salt Fog Corrosion Cabinet maintained according to ASTM B 117-73 and comprises exposing the specimens to vapor from an aqueous 5%, by weight, sodium chloride solution. The specimens are the coated steel panels prepared hereinabove. The uncoated surface of the panels as well as the edges of the coated surface are taped to prevent moisture from seeping under the coating. "Non-destructive" determinations involve visual inspection of the exposed surface of the panel at periodic intervals to determine the degree (none, light, medium, heavy) of rust formation and the amount and nature of blister formation (characterized according to ASTM D 714- "F"=fine, "M"=medium, "D"=dense). White blisters will generally indicate the presence of water while black blisters will generally indicate areas of rust and other degradation products.

"Destructive" determinations involve etching the surface of the coating through to the steel panel with a scribing tool as per ASTM D 1654-79a, measuring the "creepage" distance, i.e. the distance of delamination from the etch mark, and noting the surface conditions.

The results are as follows:

Series 1

Hardener—CYMEL 301 (alkylated melamine-formaldehyde from American Cyanamid)
Resin: Hardener Ratio—9:1
Cure Conditions—20 minutes at 200° C.
Exposure Time—864 hours

| Adduct | Creepage (mm) | Blisters | Run-Off |
|---|---|---|---|
| H | 8 | 2M (black) | small |
| I | 9 | 2F (black) | small |
| J | 9 | 2MD (black) | small |
| I-control | 9 | 4D (white) | |
| | | 2MD (black) | small |

Series 2

Hardener—HZ 949-U (as above from CIBA-GEIGY Corp.)
Resin: Hardener Ratio—3:1
Cure Conditions—20 minutes at 200° C.
Exposure Time—864 hours

| Adduct | Creepage (mm) | Blisters | Run-Off |
|---|---|---|---|
| H | 6 | 2F (black) | small |
| I | 6 | 8F (black) | medium |
| J | 6 | 8F (black) | medium |
| H-control | 8 | excessive rust-no determination | |
| I-control | 8 | excessive rust-no determination | |

Series 3

Hardener—CYMEL 300 (American Cyanamid)
Resin: Hardener Ratio—9:1
Cure Conditions—20 minutes at 200° C.
Exposure Time—864 hours

| Adduct | Creepage (mm) | Blisters | Run-Off |
|---|---|---|---|
| H | 5 | 2F (black) | small |
| I | 4 | 2M (black) | small |
| | | 6D (white) | |
| E-control | 3 | 6M (black) | medium |
| I-control | 3 | 6D (white) | medium |
| | | 2MD (black) | |

Series 4

Hardener—CYMEL 303 (American Cyanamid)
Resin: Hardener Ratio—9:1
Cure Conditions—20 minutes at 200° C.
Exposure Time—864 hours

| Adduct | Creepage (mm) | Blisters | Run-Off |
|---|---|---|---|
| H | 15 | 2F (black) | none |
| I | 7 | 2F (black) | small |
| J | 5 | 6M (black) | small |

Series 5 (as Series 4 except CYMEL 350 hardener)

| Adduct | Creepage (mm) | Blisters | Run-Off |
|---|---|---|---|
| J | 8 | 2F (black) | small |

Series 6

Hardener—BECKAMINE 21-511 (butylated urea-formaldehyde resin from Monsanto Chemical Co.)
Resin: Hardener Ratio—77:23
Cure Conditions—15 minutes at 177° C.
Exposure Time—1200 hours

| Adduct | Creepage (mm) | Blisters | Run-Off |
|---|---|---|---|
| B | 10 | 2F (black) | heavy |
| C | 8 | 2F (black) | medium |
| | | 2M (white) | |
| D | 9 | 2F (black) | medium |
| | | 2F (white) | |
| B-control | 6 | 2M (white) | medium |
| C-control | 10 | 2M (black) | small |
| | | 2MD (white) | |
| D-control | 7 | 2F (black) | medium |
| | | 2D (white) | |

This data illustrates a general pattern of improved corrosion resistance performance on the part of the instant adducts.

Summarizing, it is seen that this invention provides advanced epoxy systems which afford cured compositions exhibiting improved performance characteristics. Variations may be made in proportions, procedures and materials without departing from the scope of the invention as defined by the following claims.

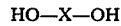

What is claimed is:

1. An advanced epoxy resin having epoxy values in the range of 0.01–0.2 epoxy equivalent per 100 grams of resin resulting from the reaction of (1) a diglycidyl ether of a di-secondary alcohol corresponding to the formula

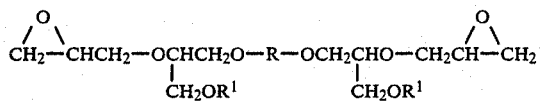

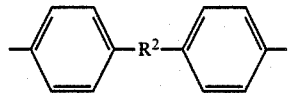

where $R^2$ represents a methylene or isopropylene group, and each $R^1$ represents an alkyl group of from 1 to 12 carbon atoms.

4. The resin of claim 3, wherein component (1) is 2,2-bis(p-3(butoxy-2-glycidyloxypropyloxy)phenyl)propane.

5. The resin of claim 1, wherein said dihydric phenol corresponds to the formula

HO—X—OH wherein X is 1,2-phenylene, 1,3-phenylene, 1,4-phenylene or

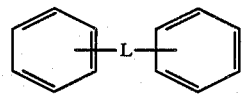

wherein L is a direct bond, alkylene of 1 to 6 carbon atoms, alkylidene of 2 to 6 carbon atoms, or

6. The resin of claim 5, wherein said dihydric phenol is bisphenol A.

7. The resin of claim 1, wherein components (1) and (2) are present in concentrations ranging from 70 to 95%, by weight, and 30 to 5%, by weight, respectively.

8. The resin of claim 1 wherein component (1) is 2,2-bis(p-3(butoxy-2-glycidyloxypropyloxy)phenyl)propane and component (2) is bisphenol A.

9. A heat curable composition which comprises the advanced epoxy resin of claim 1 and a curing agent therefor, which is a melamine-formaldehyde resin, a urea-formaldehyde resin, a phenol-formaldehyde resin, or a di-or polyfunctional isocyanate.

10. A heat curable composition which comprises the advanced epoxy resin of claim 8 and a curing agent therefor.

11. The cured composition resulting from the elevated temperature curing of the composition of claim 9.

wherein R is phenylene, naphthylene or a radical consisting of two or three phenylene groups linked by one or two carbon-carbon bonds, ether oxygen atoms, sulphur atoms, sulphonyl groups, sulphoxide groups, carbonyl groups, or alkylene groups of 1 to 5 carbon atoms, or each phenylene group or each naphthylene group being substituted in the ring or rings by one or two alkyl groups, each of from 1 to 4 carbon atoms, or by one or two chlorine or bromine atoms; and $R^1$ independently are a straight chain or branched alkyl group of 1 to 16 carbon atoms, or a straight chain or branched alkyl group of 1 to 16 carbon atoms substituted by one to four chlorine or bromine atoms; a straight chain or branched alkenyl group of 2 to 6 carbon atoms, or a straight chain or branched alkenyl group of 2 to 6 carbon atoms substituted by one to four chlorine or bromine atoms; a phenyl or naphthyl group, or a phenyl or naphthyl group substituted in the ring or rings by one or two chlorine or bromine atoms or by one or two alkyl groups, each of 1 to 4 carbon atoms, and having in all from 6 to 12 carbon atoms; a phenylalkyl or naphthylalkyl group or a phenylalkyl or napthylalkyl group substituted in the ring or rings by one or two chlorine or bromine atoms or by one or two alkyl groups, each of 1 to 4 carbon atoms, said phenylalkyl or naphthylalkyl group having in all from 7 to 12 carbon atoms; a cycloalkyl group of 3 to 6 carbon atoms; or a cycloalkylalkyl group of from 4 to 10 carbon atoms; and (2) a dihydric phenol.

2. The resin of claim 1, wherein $R^1$ are the same and each represents an alkyl group of 1 to 14 carbon atoms, allyl, cyclohexyl or benzyl.

3. The resin of claim 1, wherein R represents a group of formula